US009952351B2

(12) United States Patent
Kuznetsov et al.

(10) Patent No.: US 9,952,351 B2
(45) Date of Patent: Apr. 24, 2018

(54) SYSTEM AND METHODOLOGY FOR EVALUATING FRACTURE NETWORKS

(71) Applicant: Schlumberger Technology Corporation, Sugar Land, TX (US)

(72) Inventors: Dmitry Sergeevich Kuznetsov, Novosibirsk (RU); Sergey Mikhailovich Makarychev-Mikhailov, Richmond, TX (US); Kira Vladimirovna Yudina, Novosibirsk (RU); Alexey Viktorovich Zinchenko, Novosibirsk (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 112 days.

(21) Appl. No.: 15/109,255

(22) PCT Filed: Dec. 31, 2013

(86) PCT No.: PCT/RU2013/001212
§ 371 (c)(1),
(2) Date: Jun. 30, 2016

(87) PCT Pub. No.: WO2015/102516
PCT Pub. Date: Jul. 9, 2015

(65) Prior Publication Data
US 2016/0320528 A1 Nov. 3, 2016

(51) Int. Cl.
*G01V 99/00* (2009.01)
*E21B 43/26* (2006.01)
(52) U.S. Cl.
CPC ............ *G01V 99/005* (2013.01); *E21B 43/26* (2013.01)

(58) Field of Classification Search
CPC ............................ G01V 99/005; E21B 43/26
See application file for complete search history.

(56) References Cited

U.S. PATENT DOCUMENTS 4,724,905 A 2/1988 Uhri
5,249,864 A 10/1993 Fagan et al.
(Continued)

FOREIGN PATENT DOCUMENTS

FR 2690717 A1 11/1993
RU 16968 U1 1/2001
(Continued)

OTHER PUBLICATIONS

Decision on Grant issued in Russian Patent Appl. No. 2016131270 on Aug. 29, 2017; 13 pages.
(Continued)

*Primary Examiner* — Hezron E Williams
*Assistant Examiner* — David Z Huang

(57) ABSTRACT

A technique facilitates the study of complex fracture networks. A slot manifold is constructed with a system of branched thin channels, e.g. slots, which are joined at intersections. Fluid is flowed through the system of branched thin channels and through an intersection or intersections joining the channels in a manner which enables evaluation of fluid flow. A flow distribution device is used to allow or block flow of the fluid along specific branches of the system of branched thin channels to facilitate evaluation of fluid flow as a fluid moves through various angular changes and/or flow gap width changes from one channel to another.

20 Claims, 5 Drawing Sheets

(56) References Cited

U.S. PATENT DOCUMENTS

| | | | |
|---|---|---|---|
| 5,271,675 | A | 12/1993 | Fagan et al. |
| 5,272,333 | A | 12/1993 | Fagan et al. |
| 5,324,956 | A | 6/1994 | Fagan et al. |
| 5,326,969 | A | 7/1994 | Fagan et al. |
| 5,488,224 | A | 1/1996 | Fagan et al. |
| 6,226,390 | B1 | 5/2001 | Deruyter et al. |
| 6,766,131 | B1 * | 7/2004 | Hiraoka ............... G03G 15/104 399/237 |
| 2008/0133186 | A1 | 6/2008 | Li et al. |
| 2011/0029293 | A1 | 2/2011 | Petty et al. |

FOREIGN PATENT DOCUMENTS

| | | |
|---|---|---|
| SU | 104300 A1 | 11/1955 |
| SU | 1716559 A1 | 2/1992 |
| WO | 2001073476 A1 | 10/2001 |
| WO | 2010065769 A2 | 6/2010 |

OTHER PUBLICATIONS

International Search Report and Written Opinion issued in related International Application No. PCT/RU2013/001212 dated Sep. 30, 2014 (6 pages).

Beason et al., "The Determination of Dynamic Proppant Concentration Field in Slot Flow in the FFCF", presented at the SPE Annual Technical Conference and Exhibition, Oct. 22-25, 1995, Dallas, Texas, pp. 681-687.

Hejjo et al., "Flow Visualization Technique for Investigation of Hydraulic Fracturing", presented at the SPE Annual Technical Conference and Exhibition, Oct. 5-8, 1997, San Antonio, Texas, pp. 159-171.

Rein, Jr. et al., "Description of a Large, High-Pressure Slot Flow Apparatus for Characterizing Fracturing Fluids", presented at the SPE 68th Annual Technical Conference and Exhibition, Oct. 3-6, 1993, Houston, Texas, pp. 185-193.

* cited by examiner

SYSTEM AND METHODOLOGY FOR EVALUATING FRACTURE NETWORKS

BACKGROUND

In a variety of subterranean formations, hydrocarbon recovery can be enhanced by implementing recovery technologies, such as hydraulic fracturing techniques. The recovery technologies may be useful with producing reservoirs having low permeability, such as gas shales. The use of hydraulic fracturing techniques can be used to improve a natural fracture network by creating and propping a complex fracture network which enables higher well productivity. In many types of reservoir structures, however, complex fracture networks are difficult to model in a manner which provides a useful simulation of fluid flow for a given reservoir.

SUMMARY

In general, a system and methodology are provided for studying complex fracture networks. The technique utilizes a slot manifold having a system of branched thin channels, e.g. slots, which are joined at intersections. Fluid is flowed through the system of branched thin channels and through an intersection or intersections between channels in a manner which enables evaluation of fluid flow. A flow distribution device is used to allow or block flow of the fluid along specific branches of the system of branched thin channels to facilitate evaluation of fluid flow as a fluid moves through various angular changes from one channel to another.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
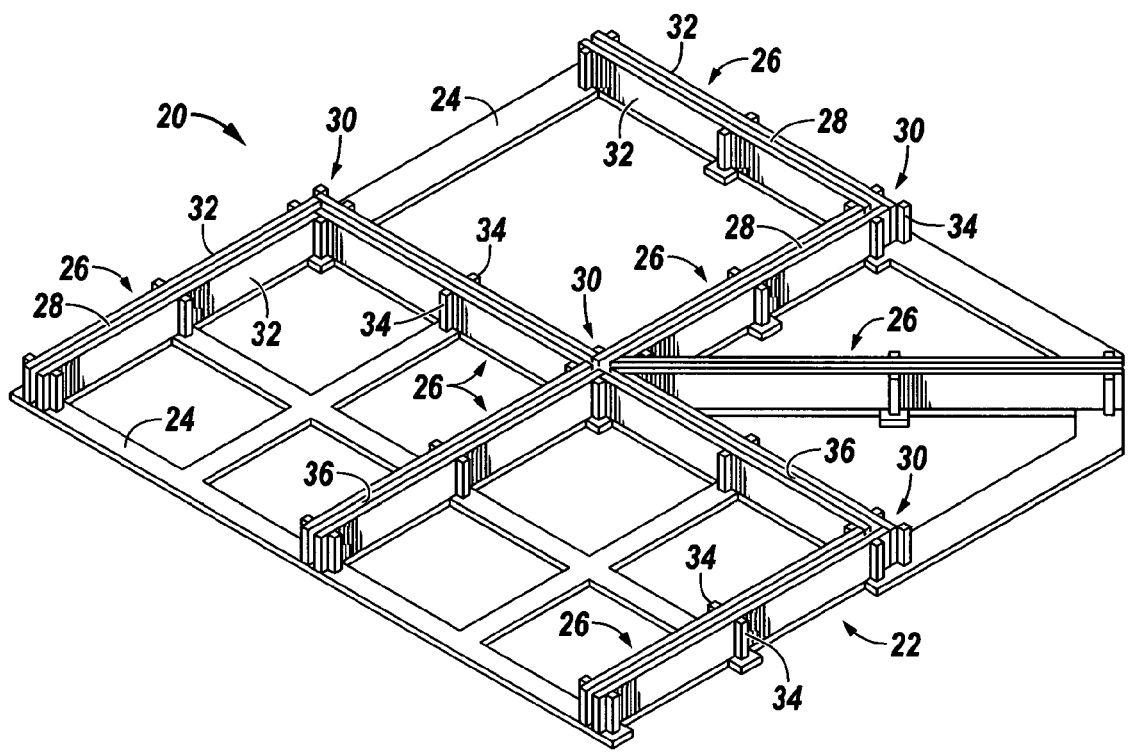
FIG. 1 is a cross-sectional illustration of an example of a system for studying complex fracture networks, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate the study of multicomponent flows in different fluids. For example, the system and methodology are useful in studying multicomponent fluid flows and fracture networks in naturally fractured reservoirs or other types of fractured reservoirs.

In an embodiment, a slot manifold is constructed with a system of branched thin channels, e.g. slots, which are joined at intersections to create a channel network. Fluid is flowed through the system of branched thin channels and through an intersection or intersections between channels in a manner which enables evaluation of fluid flow. Additional fluids may be flowed through the system to enable comparative flow analyses between the different types of fluids. Additionally, a flow distribution device may be used to allow or block flow of the fluid along specific branches of the system to enable evaluation of a variety of flow patterns as fluid flows from a first branch to a second branch positioned at a predetermined angle with respect to the first branch. The ability to change the flow patterns through the slot manifold facilitates evaluation of fluid flow as a fluid moves through various angular changes and/or slot gap width changes from one channel to another.

The real structure of naturally fractured reservoirs can be rather complex and is described systematically. However, the complex fractures can be simulated by the slot manifold described herein. By way of example, the simulated complex fracture may utilize flow channels, e.g. flow slots, in which the average hydraulic width of primary fractures is in the range of 6-9 mm. In an actual formation, primary fractures are those connected with the wellbore and lying along lines of maximum horizontal stress. In this example, the average hydraulic width of secondary fractures may be in the range of 1.5-4 mm. In an actual formation, secondary fractures are those fractures connected with primary fractures, but not connected with the wellbore, and lying along lines of minimum horizontal stress. In this example, the average hydraulic width of simulated tertiary fractures may be in the range of 4-7 mm. In an actual formation, the tertiary fractures are those connected with secondary fractures, but not connected with primary fractures or the wellbore, and lying along lines of maximum horizontal stress. However, the actual widths of the primary, secondary, and/or tertiary fractures in the simulation may be adjusted within these ranges or outside of these ranges depending on the parameters of a given reservoir being simulated.

The slot manifold described herein may have a variety of sizes, slot widths, slot lengths, and arrangements of slots for fluid flow. According to an embodiment, the slot manifold may be designed to contain a system of branched thin channels formed by slot sections arranged to create a slot or channel network. Fluid may be flowed through the slot network to facilitate evaluation of multiphase and multicomponent stream splitting at intersections between slots. The slot manifold also is designed to enable and facilitate flow direction management and evaluation of fluid flow along turns through angular changes between flow slots, e.g. changes in the flow path through 45 degree, 90 degree, 135 degree, or other angular changes in the flow path.

In an example, the slot manifold is designed with a system of thin, intersecting channels, e.g. slots, that each have a rectangular cross-section. The design enables separate inlets and/or outlets to facilitate separate inflows and/or discharges with respect to each branch of the network. The system may be constructed as an adjustable system so that fluid may be injected and/or discharged through various individual inlets and outlets. In some simulations, however, the fluid may be injected through a plurality of inlets simultaneously. Similarly, some simulations may discharge the fluid through a plurality of outlets simultaneously. Depending on the application, the fluid may be a well stimulation fluid. Multiple types of well stimulation fluids or other types of fluids may be sequentially run through the slot manifold to enable a comparison of the fluid flow characteristics between different types of fluids.

Referring generally to FIG. 1, an embodiment of a system 20 for studying complex fracture networks is illustrated. In this embodiment, system 20 comprises a slot manifold 22 mounted on a framework 24. The slot manifold 22 comprises a plurality of slot sections 26 which are arranged as a system of branched thin channels, e.g. slots, 28 along which fluid is flowed. The branched thin channels 28 are coupled at intersections 30 which join two or more slot sections 26 at selected angles with respect to each other.

In some embodiments, each slot section 26 may be formed by parallel plates 32. The parallel plates 32 of each slot section 26 are spaced to create a flow gap therebetween which serves as the channel or slot 28 along which fluid is flowed to enable evaluation of fluid flow characteristics. In the example illustrated, the plates 32 of each slot section 26 are held in place on framework 24 by fasteners 34. The fasteners 34 may comprise slidable, or otherwise adjustable, pegs which enable adjustment of the width of the flow gap which forms the channel or slot 28 between the parallel plates 32. The adjustability of the flow gap enables selective changing of the fluid flow along individual slot sections 26. In some applications, the flow gap width is adjustable for each slot section 26, although other embodiments of the slot manifold 22 may be constructed so that certain slot sections 26 are adjustable and other slot sections have a fixed flow gap width. It should be noted, however, the slot sections 26 may be formed with structures other than plates 32, and the fasteners 34 may comprise a variety of static or adjustable fasteners, including sliding fasteners, hole-and-peg fasteners, ratcheting fasteners, threaded adjusters, and other suitable fasteners.

Depending on the desired evaluation for which system 20 is employed, the slot sections 26 may have equal lengths and heights. In other applications, however, the lengths and heights may vary between slot sections 26 of a given slot manifold 22. Additionally, the flow channel 28 of each slot section 26 may be defined by an interior surface 36 and the interior surface 36 may be designed to create desired flow effects. For example, the interior surface 36 of each slot section 26 may be smooth. In other applications, the interior surface 36 of each slot section may have a rough texture. However, in other applications, some of the interior surfaces 36 may be smooth and other interior surfaces 36 may have a variety of rough textures to create the desired fluid flow simulation.

The number and arrangement of slot sections 26 may vary substantially from one slot manifold construction to another to facilitate various simulations and evaluations of fluid flow in complex fracture networks. The illustrated embodiment is provided as an example of one type of slot manifold 22 which utilizes slot sections 26 joined with each other at a plurality of different angles. As further illustrated schematically in FIG. 2, an example of slot manifold 22 comprises eight slot sections 26 labeled A-H. However, many other numbers and arrangements of slot sections 26 may be utilized to form slot manifold 22.

Figure 2:
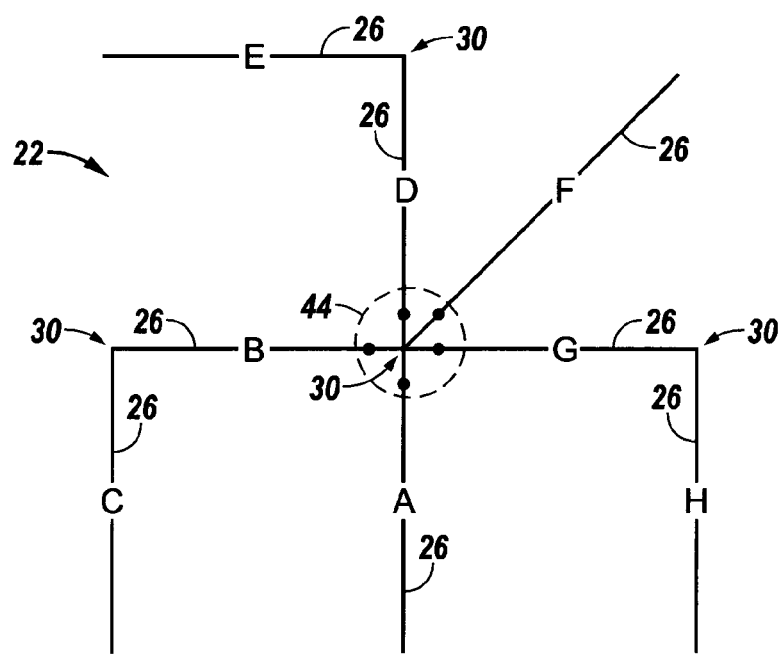
FIG. 2 is a schematic illustration of an example of a slot manifold having a plurality of connected slot sections, according to an embodiment of the disclosure.

In the example illustrated in FIG. 2, the slot sections 26 are joined at intersections 30 to create desired angles with respect to each other. For example, certain slot sections 26 may be joined perpendicularly at a common intersection 30 to form an angle of 90 degrees with respect to each other. In the embodiment illustrated, slot sections D and E as well as other slot sections 26 illustrated in FIG. 2 are joined at 90 degree angles with respect to each other. However, certain of the slot sections 26 may be joined at other angles. For example, the slot sections G and F illustrated in FIG. 2 are joined at a common intersection 30 to form an acute angle greater than 0 degrees and less than 90 degrees. By way of example, the angle between these slot sections may be approximately 45 degrees. In this example, slot sections A and F are joined at a common intersection 30 to form an obtuse angle greater than 90 degrees and less than 180 degrees. By way of example, the angle between these slot sections may be approximately 135 degrees. It should again be noted, however, that the various slot sections 26 may be arranged in a variety of patterns and joined at a variety of angles in various combinations of angles, including angles other than the 45 degree, 90 degree, and 135 degree angles discussed above.

Figure 3:
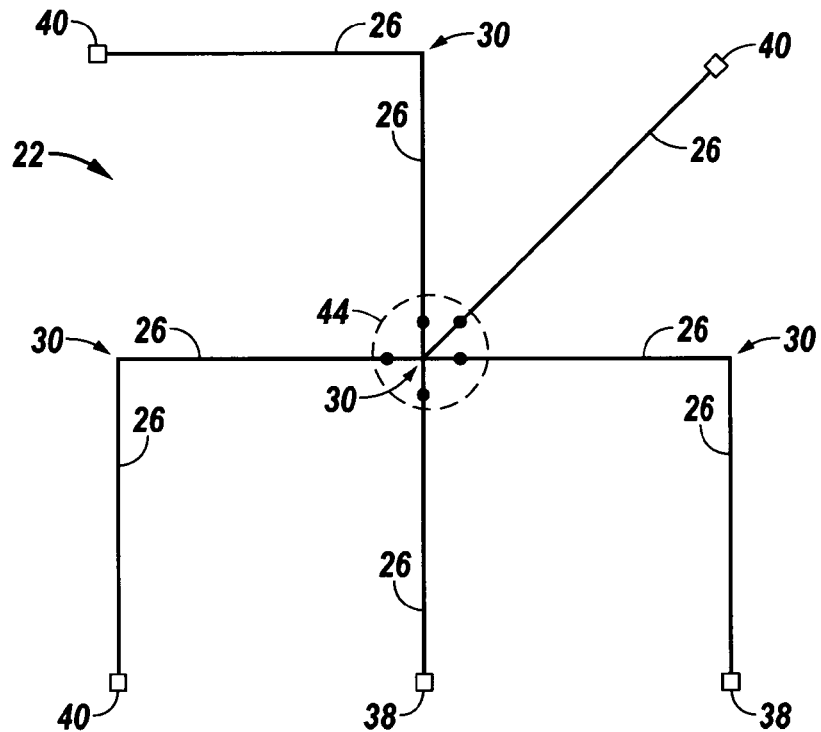
FIG. 3 is a schematic illustration similar to that of FIG. 2 but also illustrating examples of fluid flow inlets and outlets, according to an embodiment of the disclosure.

As illustrated in FIG. 3, the slot manifold 22 may comprise a variety of inlets 38 through which fluid is introduced into the network of slots 28. The slot manifold 22 also may comprise a variety of outlets 40 through which fluid is discharged from the network of slots 28. In some applications, a single inlet 38 and/or a single outlet 40 may be utilized. However, other applications utilize a plurality of inlets 38 and/or a plurality of outlets 40. The inlets 38 and outlets 40 may be created by flanges which serve as the inflow and outflow devices located at the free ends of the slot sections 26. However, a variety of devices may be used to enable injection and discharge of fluid at inlets 38 and outlets 40, respectively. The flanges, or other suitable devices, are designed to enable their interchangeable use as inlets or outlets, thus increasing the number of potential simulation flow patterns through slot manifold 22 as described in greater detail below with reference to FIG. 6.

Figure 4:
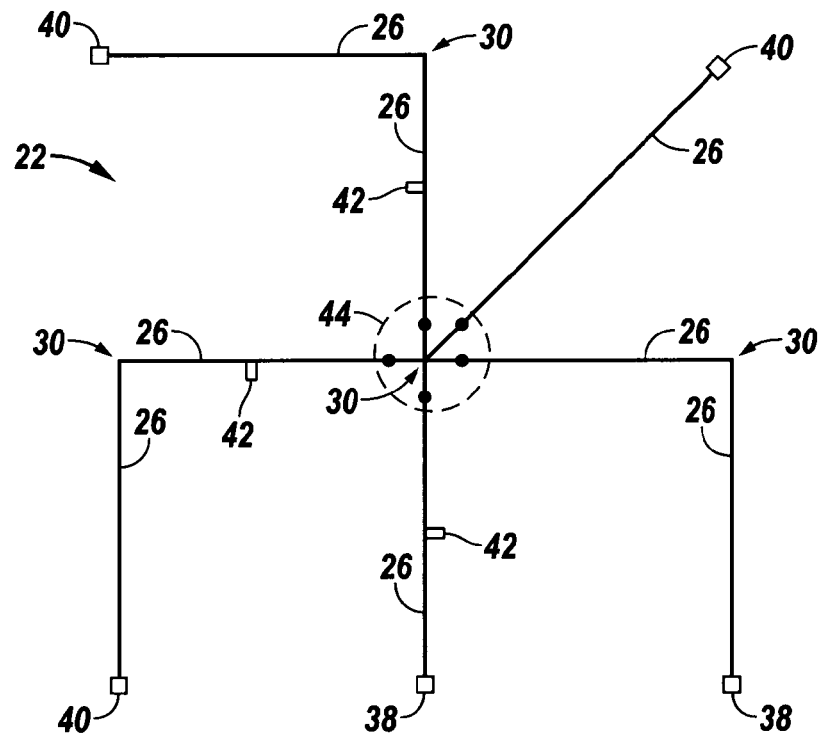
FIG. 4 is a schematic illustration similar to that of FIG. 3 but also showing examples of intermediate fluid inlets positioned between ends of the slot sections, according to an embodiment of the disclosure.

Referring generally to FIG. 4, an additional embodiment is illustrated with a plurality of intermediate inlets 42. The intermediate inlets 42 are disposed between the ends of a given slot section 26. For example, the intermediate inlets 42 may be disposed at a midpoint or at other desired locations along the selected slot sections 26. If the slots 28 are formed by parallel plates 32, the intermediate inlets 42 may be mounted to one of the side plates at a desired plate face position and may provide a port for communication of fluid into the corresponding channel or slot 28. Depending on the application, the slot manifold 22 may be designed with a single intermediate inlet 42 or a plurality of intermediate inlets 42, as illustrated in FIG. 4. The intermediate inlets 42 also may be in the form of flanges. Flanges or other suitable devices may be constructed and used at the various flow inlets and outlets to provide greater flexibility of operation. For example, the flanges or other suitable devices may again be selected so that the illustrated inlets 38, 42 and outlets 40 may be interchanged to enable inflow or outflow of fluid depending on the parameters of a given fracture flow simulation application.

Figure 5:
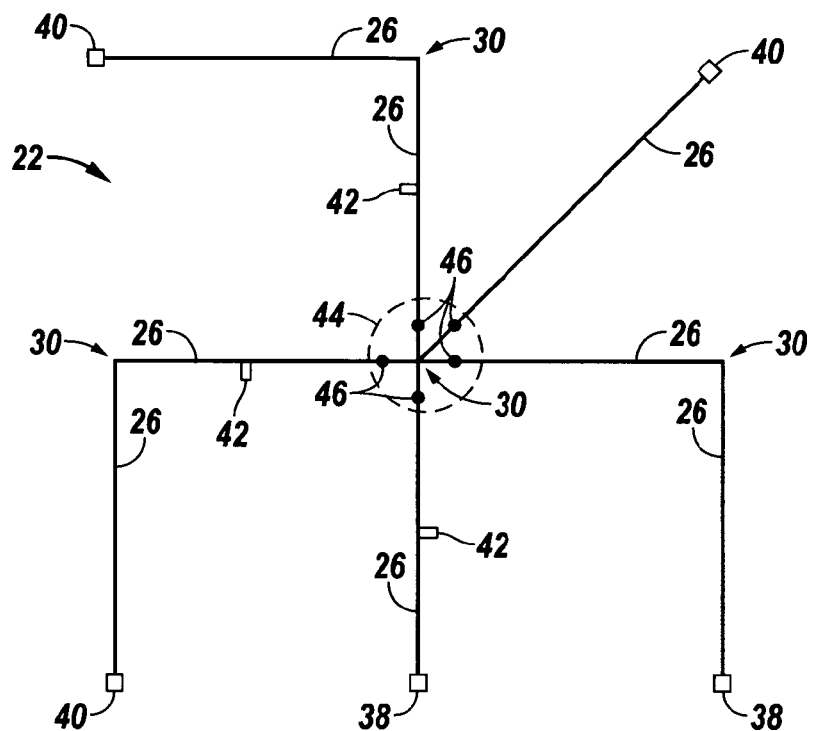
FIG. 5 is a schematic illustration similar to that of FIG. 4 but showing an example of a flow distribution device, according to an embodiment of the disclosure.

As illustrated in FIG. 5, the slot manifold 22 also may comprise a flow distribution device 44. The flow distribution device 44 engages the plurality of slot sections 26 and is selectively adjustable to allow or block fluid flow along the flow gap of selected slot sections 26. For example, the flow distribution device 44 may comprise a plurality of flow control members 46, e.g. valves, plugs, pins, obstructions, or other features, which may be selectively actuated to allow or block flow along the selected slots 28 of predetermined slot sections 26. By way of example, the flow distribution device 44 may comprise flow control members 46 in the form of temporary plugs placed in close proximity to the illustrated central intersection 30 joined by several of the slot sections 26.

Figure 6:
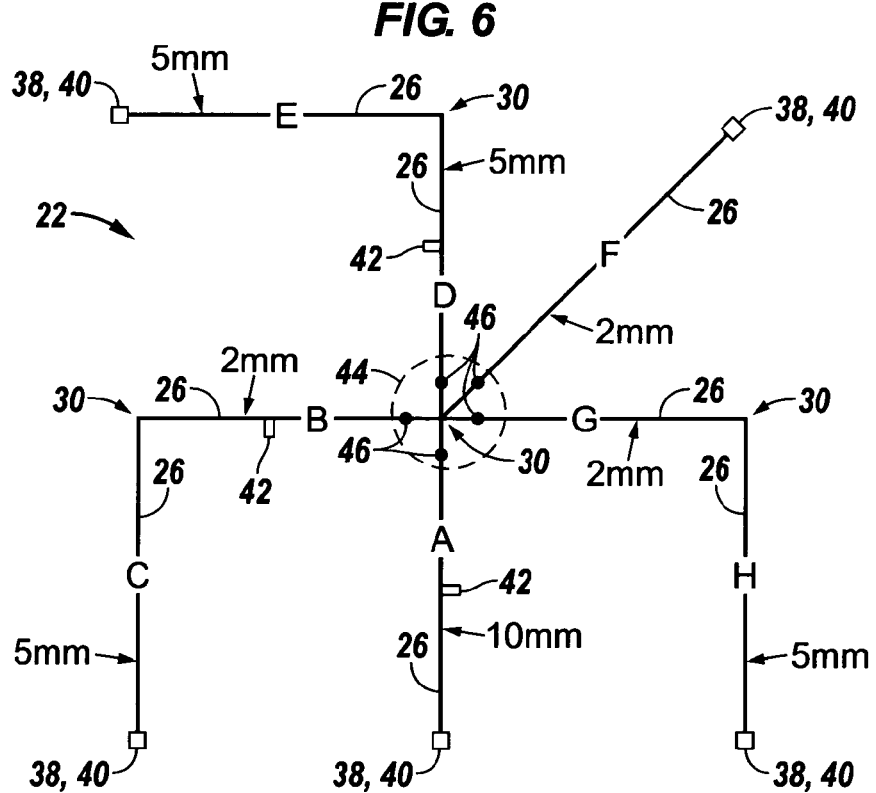
FIG. 6 is a schematic illustration similar to that of FIG. 4 but showing examples of slot widths for various slot sections of the slot manifold, according to an embodiment of the disclosure.

The widths of the flow gaps established by slots 28 may be different for different slot sections 26 to facilitate simulation of, for example, primary, secondary, and tertiary fractures. A specific example is illustrated in FIG. 6 in which the slot section A represents a primary fracture and has a relatively large flow gap width, e.g. 10 mm or another suitable width. Such a width can be selected as representative of an average hydraulic width of fractures in shales. In the specific example, slot sections B and G are generally perpendicular to slot section A and represent secondary fractures. The angle between maximum and minimum horizontal stresses often is close to 90 degrees, so the angle between primary and secondary fractures is also often close to 90 degrees. However, due to heterogeneities, the angle between primary and secondary fractures can sometimes differ substantially from 90 degrees. To capture this case, slot section F is oriented to intersect with slot section A at an angle greater than 0 degrees and less than 90 degrees, e.g. an angle of 45 degrees. In the example illustrated, slot section D is oriented as a continuation of slot section A but with a different flow gap width, e.g. 5 mm. Slot section E is selected as generally perpendicular with respect to slot section D and has a comparable flow gap width, e.g. 5 mm. In this example, slot section E also has an inlet/outlet flange at its outer end. The slot sections C and H may be oriented generally perpendicularly with respect to slot sections B and G, respectively. It should be noted that the flow gap widths selected for each of the slot sections may be increased or decreased for other flow simulations.

In operating the embodiment of slot manifold 22 illustrated in FIG. 6, flow direction management is enabled by flow distribution device 44 and the ability to control individual fluid flows via flow control members 46. The flow control members 46 may be used individually to block flow of fluid along specific slot sections 26. Although fluid flow may be directed through the slot manifold 22 in a variety of directions and along a variety of slots 28, examples are described with reference to FIG. 6 to facilitate explanation of usage of slot manifold 22 for simulating and studying fluid flows in complex fracture networks. However, the slot manifold 22 has great versatility and may be used to study a variety of different types of flows along slots of different widths and through various angular transitions.

In this specific example, inflow of fluid enters the slot manifold 22 via an inlet flange 38 at the end of slot section A. Outflow is through outlet flanges 40 at the ends of slot sections C, E, F and H. The illustrated configuration enables simulation of flow through a primary fracture with the fluid stream, e.g. fluid slug, splitting into secondary and tertiary fractures. Discharge valves can be used and adjusted to manage flow rates through the various slot branches 28. Selected slot sections may be disabled by actuating specific flow control members 46, e.g. using temporary plugs, of flow distribution device 44. The stability of the fluid stream, e.g. slug, geometry, and the turning round the corner phenomena, e.g. bridging, can be studied and observed as fluid is flowed through the slot manifold 22 in this configuration.

However, the stability, bridging, and other flow characteristics can be studied and observed in a variety of configurations of slot manifold 22. In another example, inflow of fluid is through inlet flange 38 located at the end of slot section C and outflow of fluid is through outlet flanges 40 at the ends of slot sections E, F and H. As fluid flows from the inlet flange 38 to the outlet flange at the end of slot section E, the fluid travels through three turns of 90 degrees and through three changes in slot gap widths. As fluid flows from the inlet flange 38 to the outlet flange at the end of slot section F, the fluid travels through one turn of 90 degrees, one turn of 45 degrees, and a change in slot width. As fluid flows from the inlet flange 38 to the outlet flange at the end of slot section H, the fluid travels through two turns of 90 degrees and through two changes in slot channel widths.

In another example, inflow of fluid is through inlet flange 38 located at the end of slot section E and outflow of fluid is through outlet flange 40 at the end of slot section F. As fluid flows from the inlet flange 38 to the outlet flange at the end of slot section F in this example, the fluid travels through one turn of 90 degrees, one turn of 135 degrees, and a change in slot width. The appropriate flow control members 46 are actuated to ensure the desired flow path.

In another example, inflow of fluid is through inlet flange 38 located at the end of slot section F and outflow of fluid is through outlet flange 40 at the end of slot section H. As fluid flows from the inlet flange 38 to the outlet flange at the end of slot section H in this example, the fluid travels through one turn of 135 degrees, one turn of 90 degrees, and a change in slot width. The appropriate flow control members 46 are again actuated to ensure the desired flow path.

In another example, inflow of fluid is through inlet flange 38 located at the end of slot section H and outflow of fluid is through outlet flange 40 at the end of slot section F. As fluid flows from the inlet flange 38 to the outlet flange at the end of slot section F in this example, the fluid travels through one turn of 90 degrees, one turn of 135 degrees, and a change in slot width at a different intersection 30 than the example described above with fluid flowing from the inlet flange at the end of slot section E to the outlet flange at the end of slot section F. The appropriate flow control members 46 are actuated to ensure the desired flow path.

Additionally, other flow characteristics can be studied and observed, such as the transformation of radial flow into linear flow and slug splitting at slot section intersections. These types of flow characteristics and other flow characteristics may be studied by arranging a variety of configurations of slot manifold 22. In an example, inflow of fluid is through intermediate inlets 42 each located at an intermediate position along slot sections A, B and D, and outflow of fluid is through outlet flanges 40 at the ends of slot sections A, C, E, F and H. Various patterns of flow may be studied and observed by blocking flow, e.g. plugging flow slots 28, along selected slot sections A, B, D, F, G via flow distribution device 44. This enables the simulation of a wide variety of fluid flows in various complex fracture networks.

The versatility of slot manifold 22 facilitates the study of fluid flows in many types of complex fracture networks. The slot manifold 22 also may have a variety of components and features which similarly facilitate the study of fluid flow. For example, the slot sections 26 may be formed with parallel plates 32 having a small gap therebetween or with other structures designed to create the desired slots 28. The flow distribution device 44 may be made with rods or plugs that may be selectively inserted to prevent flow into one or several slot sections 26, however the flow distribution device 44 may be constructed with valves or other features for blocking or allowing flow along selected slot sections.

The flow distribution device 44 may work in cooperation with a variety of arrangements of slot sections 26 to enable simulation of flows in many different patterns, including E, X, T and L shaped patterns with variable angles between the slot sections. In some applications, the widths of the slots may be adjusted to change the slot gap widths from one slot section to the next. The various inlet and outlet flanges may be interchanged to create inlets or outlets at the ends of several of the slot sections 26. Additionally, flanges may be employed at intermediate points along selected slot sections 26 to provide additional possible inlets and/or outlets.

Figure 7:
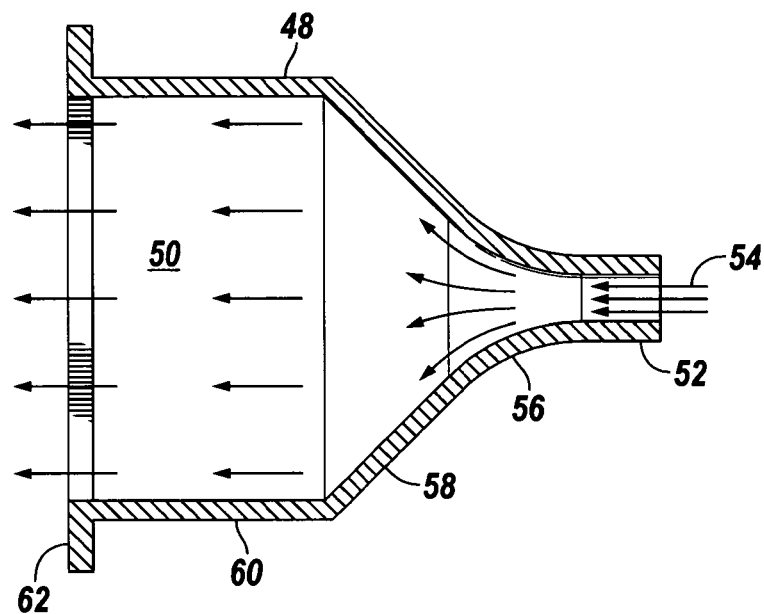
FIG. 7 is a cross-sectional view of an example of a fluid flow inlet/outlet of the slot manifold, according to an embodiment of the disclosure.
Figure 8:
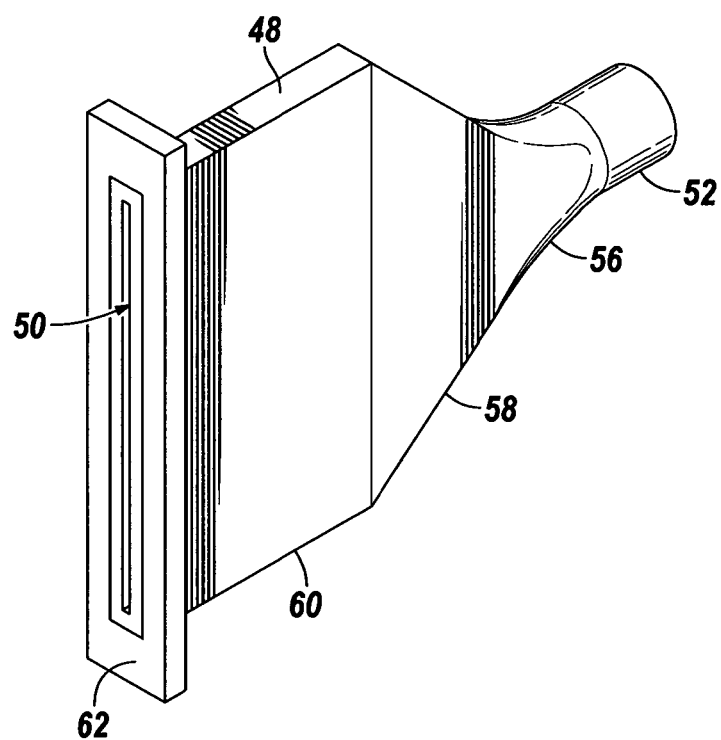
FIG. 8 is an orthogonal view of an example of a fluid flow inlet/outlet of the slot manifold, according to an embodiment of the disclosure.
Figure 9:
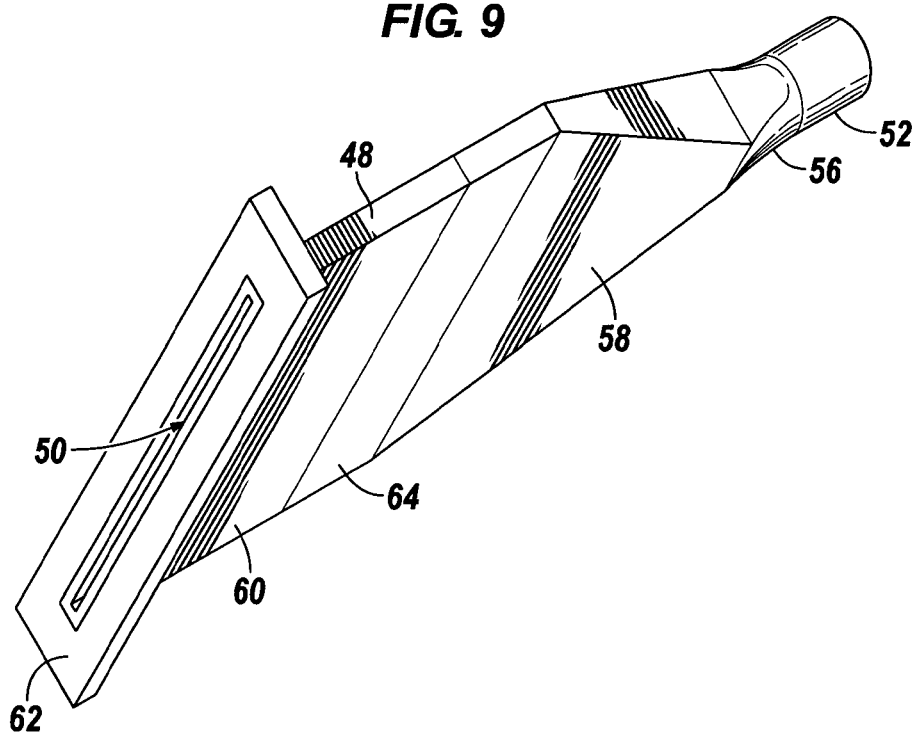
FIG. 9 is an orthogonal view of another example of a fluid flow inlet/outlet of the slot manifold, according to an embodiment of the disclosure.

The inlets 38, 42 and outlets 40 also may have various configurations. In FIGS. 7-10, examples of inlets 38, 42/outlets 40 are provided. Referring initially to FIGS. 7 and 8, an example of inlet 38, 42 or outlet 40 is illustrated (FIG. 7 illustrates inwardly directed flow through an inlet 38, but the structure also can be used for outlets 40). In this example, the inlet/outlet comprises a housing 48 having a hollow interior 50. The housing 48 is structured to provide a flow pipe 52, e.g. an inlet flow pipe. If, for example, housing 48 serves as an inlet housing, fluid flow enters through flow pipe 52 as indicated by arrows 54 in FIG. 7. In this example, the housing 48 further comprises a transition section 56, a diffuser/confuser section 58, a flow stabilizer section 60, and a connector 62, e.g. a connection flange.

Figure 10:
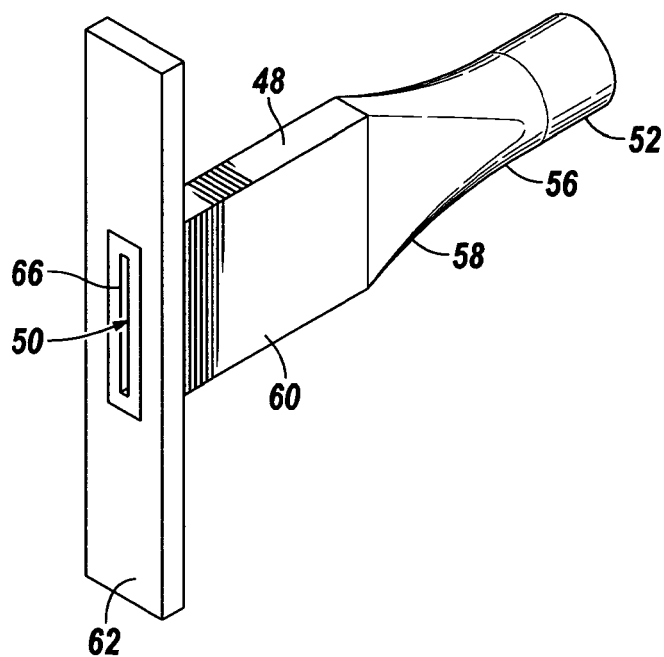
FIG. 10 is an orthogonal view of another example of a fluid flow inlet/outlet of the slot manifold, according to an embodiment of the disclosure.

Depending on the application, housing 48 also may have other configurations. Referring generally to the embodiment of FIG. 9, for example, the housing 48 may be constructed with an additional diffuser section 64. In some applications, the housing 48 may be constructed with a limited flow area 66, e.g. a limited entry. By way of example, the limited flow area 66 may be provided by reducing slot height of the flow stabilizer section 60, as illustrated in the embodiment of FIG. 10.

In the examples illustrated, housing 48 is constructed to provide control over the fluid flow. With respect to inlets, for example, the housing 48 may be constructed to flatten the incoming flow such that the fluid velocity field at a slot section entry is uniform over the slot height (or over part of the slot height when using a limited entry device such as that illustrated in the embodiment of FIG. 10). With respect to outlets, for example, the housing 48 may be constructed to organize a uniform flow over the slot height for fluid outflow from the corresponding slot section, e.g. from the final slot section.

Many types of materials and components also may be used in constructing the overall system 20. For example, the slot manifold 22 may be constructed with components formed from a variety of materials. Similarly, framework 24 may be constructed in a variety of shapes and forms with several types of materials. Depending on the design of slot manifold 22 and framework 24, several types of fasteners 34 may be used to secure the slot manifold 22 in a desired configuration. In some applications, fasteners 34 may be designed to enable adjustment of the slot sections 26 in a manner which changes the flow gap width and/or the overall arrangement of slot sections 26. Accordingly, system 20 may be constructed in several configurations to achieve the desired functionality for a given study of a selected complex fracture network.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for studying complex fracture networks, comprising:
 a slot manifold having:
  a plurality of slots sections connected together at angles with respect to each other, each slot section being formed by parallel plates having a flow gap there between;
  a flow distribution device engaging the plurality of slots sections, the flow distribution device being selectively adjustable to allow or block fluid flow along the flow gap of selected slots sections of the plurality of slots sections; and
  a plurality of fluid flow inlets and outlets to enable inflow and outflow of fluid with respect to the plurality of slot sections to simulate fracture network flow between fractures oriented at a plurality of different angles with respect to each other.

2. The system as recited in claim 1, wherein the flow gap width is adjustable.

3. The system as recited in claim 2, wherein the flow gap width is adjustable for each slot section of the plurality of slot sections.

4. The system as recited in claim 1, wherein an inside surface of each slot section defines a flow slot, the inside surface being smooth.

5. The system as recited in claim 1, wherein an inside surface of each slot section defines a flow slot, the inside surface being rough.

6. The system as recited in claim 1, wherein the plurality of fluid flow inlets and outlets comprises a plurality of fluid inlets positioned at ends of slot sections of the plurality of slot sections.

7. The system as recited in claim 1, wherein the plurality of fluid flow inlets and outlets comprises a plurality of fluid outlets positioned at ends of slot sections of the plurality of slot sections.

8. The system as recited in claim 1, wherein the plurality of fluid flow inlets and outlets comprises a fluid inlet at a plate face position located between ends of at least one of the slot sections.

9. The system as recited in claim 1, wherein the plurality of fluid flow inlets and outlets comprises a fluid outlet at a plate face position located between ends of at least one of the slot sections.

10. The system as recited in claim 1, wherein at least two slot sections of the plurality of slot sections are arranged perpendicularly with respect to each other.

11. The system as recited in claim 10, wherein at least two slot sections of the plurality of slot sections are arranged at an acute angle with respect to each other, the angle being greater than 0 degrees and less than 90 degrees.

12. The system as recited in claim 11, wherein the acute angle is approximately 45 degrees.

13. A method for studying complex fracture networks, comprising:
   arranging a plurality of slot channels into a slot manifold having interconnected slots arranged at different angles with respect to each other to create a slot network;
   flowing a simulated well fluid into an inlet of the slot manifold and through the slot network;
   using a flow distribution device to block or allow flow along selected slot channels of the plurality of slot channels; and
   analyzing the flow of simulated well fluid through the slot network.

14. The method as recited in claim 13, further comprising flowing a plurality of different types of simulated well fluid through the slot network; and comparing the flow characteristics of the different types of simulated well fluids.

15. The method as recited in claim 13, wherein flowing comprises flowing the simulated well fluid into a plurality of inlets simultaneously.

16. The method as recited in claim 13, further comprising discharging the simulated well fluid from the slot manifold through a plurality of outlets simultaneously.

17. The method as recited in claim 13, wherein arranging comprises arranging at least two slot channels of the plurality of slot channels at approximately 90 degrees with respect to each other.

18. The method as recited in claim 13, wherein arranging comprises arranging at least two slot channels of the plurality of slot channels at an angle greater than 0 degrees and less than 90 degrees with respect to each other.

19. A method for studying complex fracture networks, comprising:
   providing a slot manifold with a system of branched thin channels coupled at intersections;
   flowing a fluid through the system of branched thin channels to create at least one of multiphase and multicomponent fluid stream splitting as the fluid passes through at least one of the intersections; and
   using a flow distribution device to control flow of the fluid along desired branches of the system of branched thin channels.

20. The system as recited in claim 19, wherein providing comprises arranging the system of branched thin channels with branches intersecting each other at a plurality of different angles, including acute angles, obtuse angles, and 90 degree angles.

* * * * *